Figure 1:
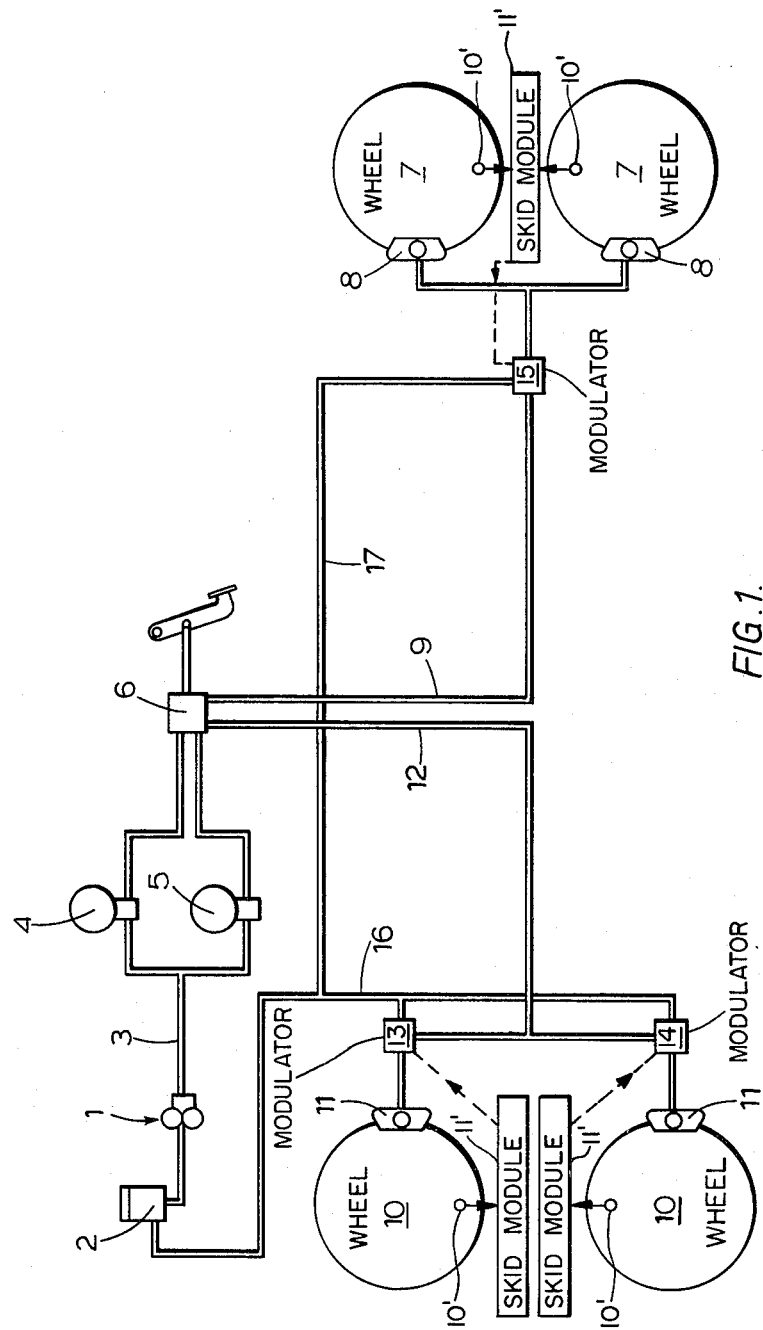

United States Patent [19]

Mortimer

[11] 4,350,396
[45] Sep. 21, 1982

[54] MODULATOR ASSEMBLIES FOR VEHICLE ANTI-SKID BRAKING SYSTEMS

[75] Inventor: Ivan Mortimer, Solihull, England

[73] Assignee: Lucas Industries Limited, Birmingham, England

[21] Appl. No.: 124,264

[22] Filed: Feb. 25, 1980

[30] Foreign Application Priority Data

Feb. 23, 1979 [GB] United Kingdom ............... 7906551

[51] Int. Cl.$^3$ ............................................. B60T 8/02
[52] U.S. Cl. .................................. 303/115; 303/116; 303/119
[58] Field of Search ................ 303/113, 114, 115, 116, 303/117, 118, 119, 61-63, 68-69, 10-12; 188/181 A, 181 R; 137/110; 251/139, 140, 129, 141

[56] References Cited

U.S. PATENT DOCUMENTS

| | | | |
|---|---|---|---|
| 3,645,584 | 2/1972 | Leiber et al. | 303/119 X |
| 3,661,427 | 5/1972 | Hodge | 303/116 |
| 3,752,537 | 8/1973 | Ochiai | 303/115 |
| 3,994,538 | 11/1976 | Farr | 303/115 |
| 4,033,638 | 7/1977 | Bertone et al. | 303/116 |

FOREIGN PATENT DOCUMENTS 1324593 9/1970 United Kingdom .
1509187 5/1978 United Kingdom .

Primary Examiner—Douglas C. Butler
Attorney, Agent, or Firm—Scrivener, Clarke, Scrivener and Johnson

[57] ABSTRACT

The disclosure concerns an anti-skid brake control system of the kind which senses the presence of skid conditions at a hydraulically braked wheel and then automatically relieves the brake pressure at that wheel by expanding the volume of a chamber connected to the wheel brake. In the system disclosed, a regulator is connected in a high pressure fluid supply line so as to control the rate at which the volume of the chamber is reduced on cessation of the skid conditions, thereby controlling the rate at which the brakes are re-applied. In the particular embodiment described, the regulator comprises a cup-shaped piston reciprocable within a cylinder bore. A first restriction of predetermined size is defined by the end wall of the piston and a second restriction of variable size is formed between a number of radial ports in the bore wall and an annular recess in the outside of the piston, this recess being permanently connected to the inner space of the piston. Fluid flows from the variable restriction to the predetermined restriction and a pressure difference is produced across the predetermined restriction. Any increase in this pressure difference causes the piston to move against the action of a compression spring to restrict the size of the variable restriction, thereby regulating the flow of fluid to a predetermined value.

10 Claims, 4 Drawing Figures

MODULATOR ASSEMBLIES FOR VEHICLE ANTI-SKID BRAKING SYSTEMS

This invention relates to anti-skid braking systems for vehicles, of the kind which comprise a movable wall such as a piston, which is arranged to vary the volume of a chamber connected to a hydraulic wheel brake, and means for retracting the movable wall to increase the volume of the chamber and so reduce the hydraulic pressure in the wheel brake in response to a signal from a skid sensing device, thereby relieving the braking pressure and alleviating the skid condition.

Some examples of systems of this kind are described in United Kingdom patent specification No. 1,324,593.

As stated in Specification No. 1,324,593, it is desirable in systems of this kind, to restrict the rate at which the hydraulic pressure in the wheel brake is re-developed on cessation of a skid signal from the skid sensing device, to enable the skid sensing device to sense what is occurring during re-application of the brakes. In that Specification, an orifice is used to control the re-development of brake pressure on cessation of a skid signal.

Whilst the systems disclosed in that Specification work extremely well at hydraulic fluid supply pressures for which the systems were designed, typically 2000 $KN/m^2$ (300 p.s.i.), when a relatively high pressure fluid supply is used the diameter of the orifice which is required to control the re-development of brake pressure can become unacceptably small. A very small orifice can be difficult to machine with accuracy and can easily become blocked with foreign matter, thereby preventing re-application of the brake.

According to the invention, an anti-skid brake control system comprises a wheel having a hydraulic brake, means to sense the presence of skid conditions at the wheel during braking and thereupon to produce a skid signal, a movable wall separating a pair of chambers, one of the chambers being connected to the hydraulic brake and the movable wall being arranged to increase the volume of that chamber in response to the skid signal so as to relieve the brake pressure at the braked wheel, and a regulator arranged to regulate flow of fluid to the second of the chambers on cessation of the skid signal such that the movable wall is thereby moved progressively to reduce the volume of the first chamber so as to re-apply the brake pressure at a controlled rate, the regulator comprising a first restriction of predetermined size connected in series with a second restriction defined between two relatively movable members, relative movement of the members being controlled by the difference in fluid pressure across the first restriction such that an increase in this pressure difference causes a reduction in the size of the second restriction.

A predetermined pressure drop tends to be maintained across the first restriction during progressive re-application of the brakes, and this pressure drop is substantially independent of supply pressure.

Since the first restriction is not the sole means of restricting the fluid flow, the opening defined by the first restriction can be made of greater size than would otherwise be possible.

Preferably the first restriction is located downstream of the second restriction. Thus, any foreign matter present in the fluid supply to the regulator tends to lodge in the second restriction, resulting in a drop in the pressure difference across the first restriction which in turn causes an increase in the size of the second restriction so that the obstruction tends to be released.

Preferably the first restriction is defined by one of the relatively movable members and that member is resiliently biassed against the action of the pressure difference across the first restriction.

The characteristics of the means by which the member is biassed may be chosen such that the majority of the pressure drop across the regulator occurs across the second restriction so that the opening defined by the first restriction can be made relatively large.

Conveniently, the relatively movable member defining the first restriction is a piston which is movable within a bore, and the bore wall is the other relatively movable member. In a particularly preferred arrangement, the piston is cup-shaped, the first restriction is defined by the end wall of the piston and the second restriction is defined between at least one radial passageway in the wall of the bore and an annular recess in the outside of the piston, the recess being in permanent communication with the inner space of the piston. Alternatively, the radial passageway or passageways may be formed on the wall of the cup-shaped piston and the annular recess may be formed in the wall of the bore. The annular recess eliminates the need for circumferential alignment of passageways in the two walls.

The fluid source which supplies the hydraulic brake with fluid during normal braking may be a hydrostatic master cylinder or a high pressure hydraulic fluid source.

Preferably a common source of hydraulic fluid supplies the regulator and the hydraulic wheel brake.

Preferably a three-way valve is interposed between the second chamber and the regulator, the valve being responsive to the skid signal such that the second chamber normally is connected to the regulator but on production of the skid signal the valve is switched to connect the second chamber to an outlet for fluid. This arrangement allows the second chamber to be connected via the regulator to its fluid supply under normal (non-skid) conditions so that the pressure of that supply acting on the movable wall tends to maintain the volume of the first chamber (which is connected to the hydraulic brake) at a minimum value. On the occurrence of skid conditions the second chamber is isolated from its supply so that fluid may pass from the second chamber through the outlet under the pressure of fluid in the hydraulic brake circuit acting on the movable wall from within the first chamber.

A two-way valve is preferably connected in the fluid supply line to the hydraulic brake, the valve being arranged to close when the movable wall moves to increase the volume of the chamber connected to the hydraulic brake. Thus, the hydraulic brake is isolated from its fluid supply during skid conditions to assist in reducing the brake pressure.

In a much preferred embodiment of the invention, the movable wall and the first and second chambers, the regulator, the three-way valve and the two-way valve are all contained within a single housing which may be formed in one or as many parts as is necessary for manufacturing convenience. Thus, a major part of the anti-skid brake control system here described may be provided in a single low-cost unit which may easily be installed or replaced.

When the fluid source is a hydrostatic master cylinder, fluid expelled from the second chamber via the outlet on the occurrence of a skid signal is preferably directed to a scavenge pump which returns the fluid to the master cylinder. This ensures that there is no overall loss of fluid from the master cylinder during a cycle of operation of the modulator. A reservoir is preferably connected between the second chamber and the scavenge pump.

Figure 2:
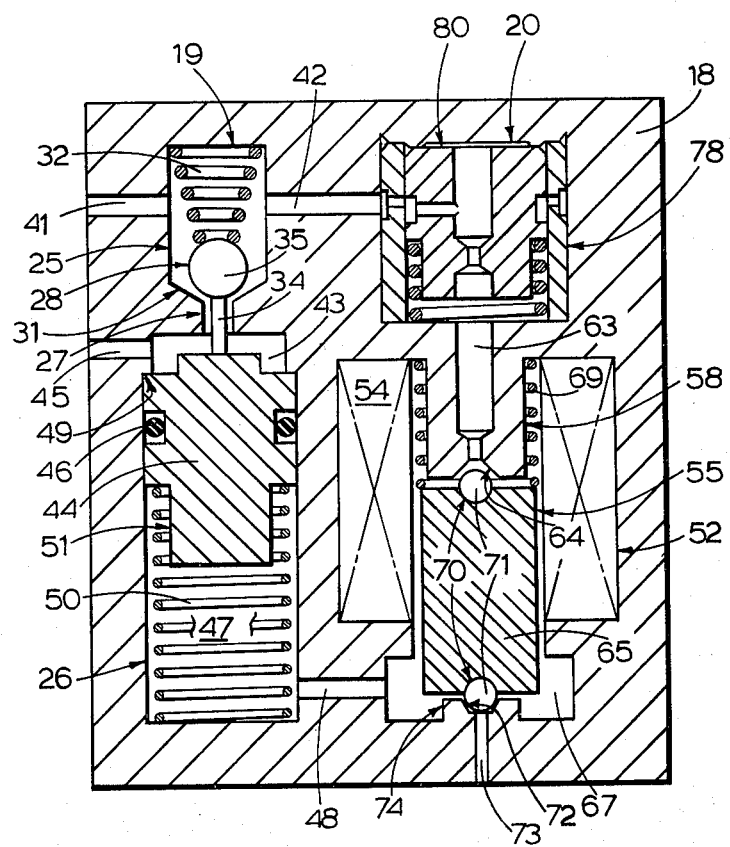
Figure 3:
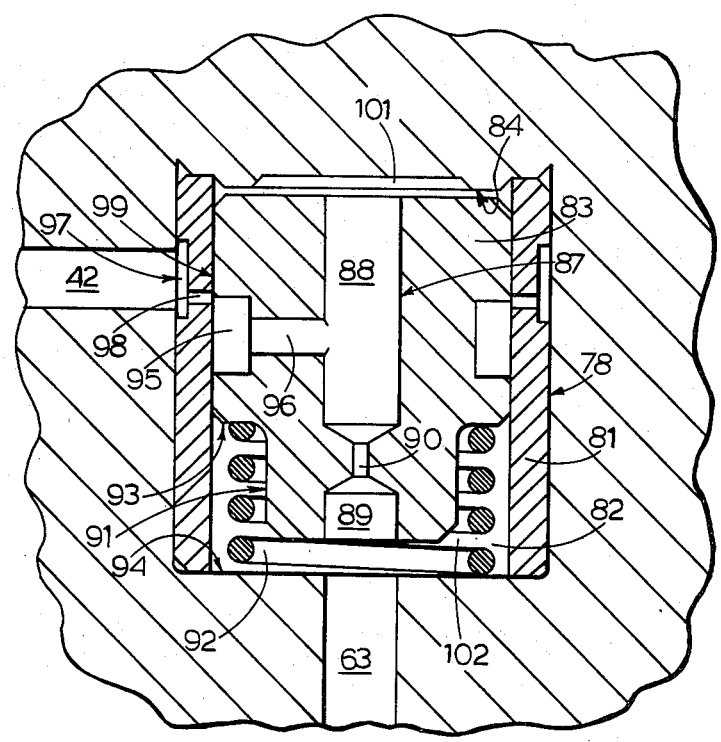
Figure 4:
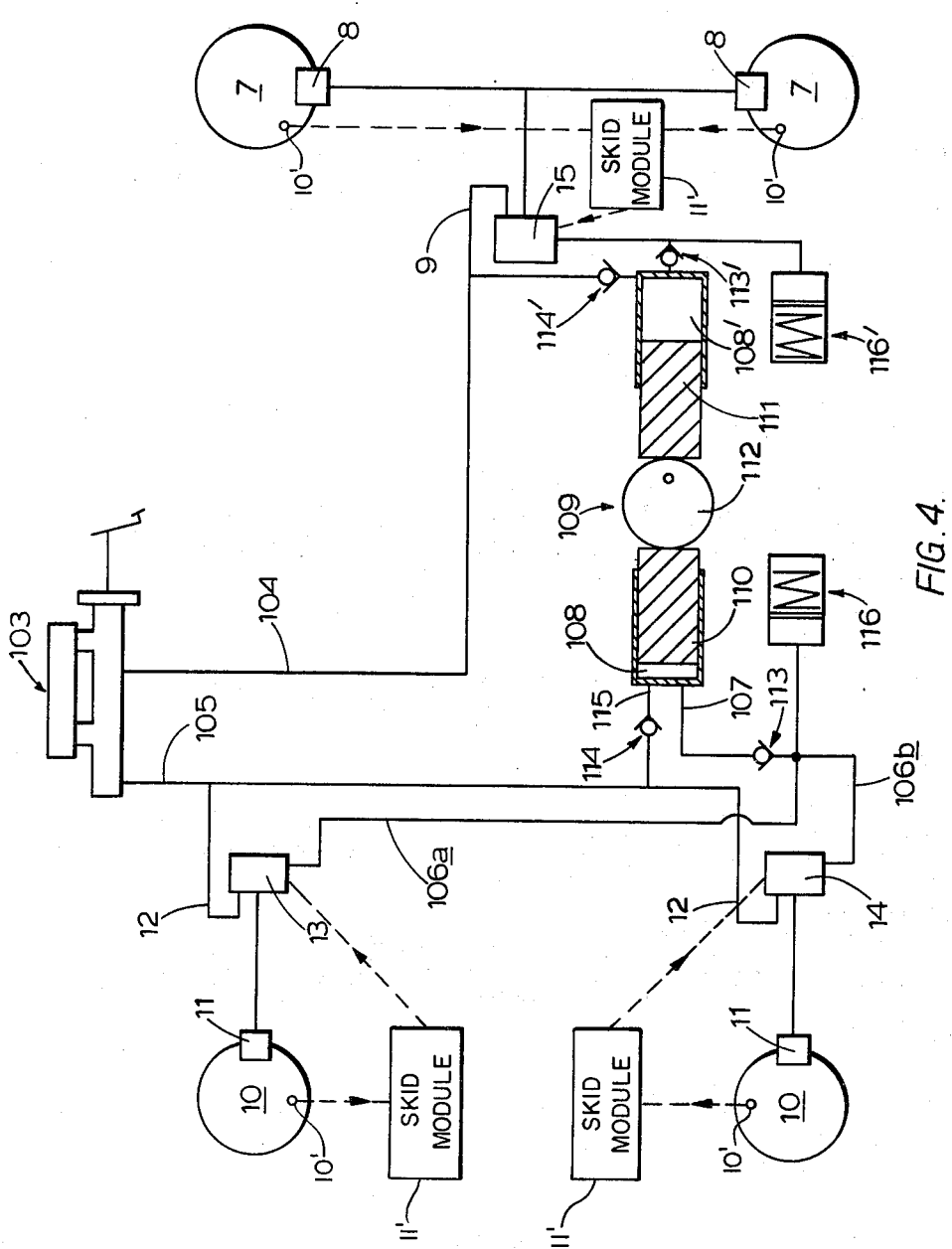

The invention will now be further described, by way of example only, with reference to the accompanying drawings, in which:

FIG. 1 is a schematic circuit diagram of a system in accordance with the invention incorporated in a motor vehicle, FIG. 2 is a vertical cross-section of one of the modulator assemblies of the system of FIG. 1, FIG. 3 is an enlarged view of the upper righthand portion of FIG. 2 showing the regulator piston in a different position, and FIG. 4 is a scematic circuit diagram of a second system in accordance with the invention.

With reference to FIG. 1, a pump and unloader valve assembly 1 which constitutes a high pressure hydraulic fluid source, supplies hydraulic fluid from a reservoir 2 to a main supply line 3. The main supply line 3 feeds independent hydraulic accumulators 4 and 5 which are respectively connected to two braking circuits controlled by a pedal-operated dual control valve 6. A suitable valve is described in United Kingdom Patent Specification No. 1 509 187. The rear wheels 7 of the vehicle have wheel brakes 8 which, during normal braking, are fed with hydraulic fluid from the accumulator 4 via a supply line 9. The front wheels 10 have wheel brakes 11 which, during normal braking, are fed with hydraulic fluid from accumulator 5 via a supply line 12.

Three identical modulator assemblies 13, 14 and 15 are incorporated in the system for reducing the fluid pressure at the wheel brakes 8, 11, in the event of a skid condition. Each of the front wheel brakes 11 has a separate modulator assembly 13, 14, whereas a single modulator assembly 15 controls both rear wheel brakes 8.

Each of the four wheels has a speed sensor 10' for sensing the speed of the associated wheel. The sensors are connected to electronic modules 11' which ascertain whether or not a skid condition is imminent at the respective wheel and, if it is, sends an electrical control signal to the respective modulator assembly 13, 14 or 15. Suitable sensors and electronic modules are well known in the art and so will not be described here in detail.

Lines 16 and 17 respectively connect the front wheel brake modulator assemblies 13, 14, and the rear wheel brake modulator assembly 15 to the reservoir 2 to return fluid to the reservoir when the associated modulator assembly is actuated. However, as will become apparent from the following description, fluid is not returned from the wheel brakes themselves to the reservoir during a skid condition.

Referring now to FIG. 2, each modulator assembly 13, 14, 15, comprises a housing 18 having two parallel stepped bores 19 and 20. Bore 19 comprises upper and lower bore portions 25 and 26 respectively, connected by an intermediate portion 27 of reduced diameter. A one-way ball valve assembly 28 is located at the junction of bore portions 25 and 27 and comprises a ball 35 which is urged against a seat 31 at the step in the bore, by a compression spring 32. A push-rod 34, which is not connected to the ball 35, is located in the intermediate bore portion 27.

An inlet port 41 in housing 18 is connected to the appropriate high pressure supply line 9 or 12, and communicates permanently with the upper bore portion 25 and with an aligned drilling 42 leading to the upper portion of bore 20.

A modulator piston 44 is located in the lower bore portion 26. This piston constitutes the movable wall referred to above. A first modulator chamber 43 is defined between the upper end of the modulator piston 44 and the upper end-wall of bore portion 26. This chamber 43 communicates permanently with a port 45 which is connected directly to the appropriate wheelbrake 8 or 11. A sealing ring 46 is located in an annular groove in the piston 44. A second modulator chamber 47 is defined between the lower end of the piston 44 and the lower end-wall of bore portion 26, and this chamber communicates permanently with the lower end of bore 20 by a drilling 48.

Piston 44 is urged upwards in bore portion 26 by means of a compression spring 50 which is located over a spigot 51 on the lower end of piston 44. The preloading of spring 50 is greater than that of spring 32 so that the ball 35 is normally held clear of seat 31 by rod 34 thus allowing communication between ports 41 and 45 during normal braking. In this position, the piston 44 abuts a shoulder 49 in bore portion 26.

Bore 20 comprises an enlarged portion 52 in which the solenoid 54 of a solenoid-controlled ball valve assembly 55 is located. A spigot 58, which is integral with the housing 18, extends downwardly into the bore of solenoid 54. This spigot has an axial through-bore 63, part of the bore 20, with a valve seat 64 at its lower end.

An armature 65 of circular cross-section is located with clearance in the bore 20 with its upper portion located within the bore of solenoid 54, and its lower portion projecting into a cavity 67 which communicates with enlarged bore portion 52 and, via drilling 48, with second modulator chamber 47. The armature 65 is resiliently biassed downwards by a compression spring 69 located over the spigot 58. Armature 65 has at opposite ends, axial recesses 70 in which are located respective balls 71 of the ball valve assembly 55. The upper ball 71 is positioned to seat against the valve seat 64, and the lower ball against a valve seat 72 formed on a boss 74 disposed centrally of cavity 67. An outlet port 73 opens into the centre of valve seat 72.

When solenoid 54 is not energised, the armature 65 holds the lower ball 71 against seat 72 under the action of spring 69, to close outlet port 73. Upper ball 71 is free to move away from seat 64 to permit free communication between bore 63 and second modulator chamber 47 via cavity 67 and drilling 48.

Bore 20 also comprises an upper portion 78 in which is located a regulator assembly 80 which will now be described with reference to FIG. 3.

The bore portion 78 is lined by a sleeve 81 which defines a cylinder bore 82 in which a regulator piston 83 is slidable. This piston 83 has an axial bore 87 comprising upper and lower portions 88 and 89 respectively, communicating permanently with each other via an orifice 90. This orifice constitutes the first restriction of predeterminded size referred to above. A spigot 91 is formed at the lower end of the piston 83. A compression spring 92 is located over the spigot 91 with its upper end abutting a step 93 formed by the junction of spigot 91 with the body of the piston and its lower end abutting a step 94 formed by the junction of bore portions 78 and 63. Thus, as shown in FIG. 2, the piston 83 is urged upwards by the spring 92 to abut upper end wall 84. In FIG. 3, the piston 83 is shown displaced downwards from wall 84 under pressure of fluid, as will be explained below. Piston 83 has at its mid-length an external annular recess 95 which communicates permanently with bore portion 88 by a radial passage 96.

The sleeve 81 has an external annular recess 97 which is arranged to communicate permanently with the drilling 42. The sleeve 81 also has a series of circumferentially spaced radial ports 98, the outer ends of which open into the recess 97, and the inner ends of which communicate in a restricted manner with the annular recess 95. This restriction is caused by the outer surface 99 of the regulator piston 83, immediately adjacent to the recess 95. The degree of restriction depends upon the position of the piston 83 in the bore 82 relative to the ports 98. This restriction constitutes the second restriction referred to above.

Pressure spaces 101 and 102 respectively are defined between the upper end of regulator piston 83 and the upper end wall 84 of bore portion 78, and between the lower end of regulator piston 83 and the lower end wall 94 of bore portion 78. The areas of the upper end lower ends of regulator piston 83 exposed to pressure spaces 101 and 102 respectively, are equal.

The operation of the modulator assembly of FIGS. 2 and 3 will now be described.

During normal braking, port 45, which is connected to the appropriate wheelbrake 8 or 11, communicates freely with inlet port 41 through restricted bore portion 27 and valve assembly 28, the ball 35 being held off seat 31 by push-rod 34 since piston 44 is urged upwards by spring 50. Second modulator chamber 47 contains hydraulic fluid at the pressure which exists at inlet port 41, this port communicating with chamber 47 via drilling 42, ports 98, recess 95, passage 96, orifice 90, bore 63, cavity 67 and drilling 48. Regulator piston 83 is held against wall 84 by spring 92 to provide unrestricted flow between the radially inner ends of ports 98 and recess 95. During normal braking, solenoid 54 is not energised, so that lower valve member 71 is held against seat 72 to isolate outlet port 73.

If an electronic module detects an imminent skid, it sends a skid signal to the solenoid 54 of the associated modulator assembly to energise the solenoid. Energisation of solenoid 54 causes an upward movement of armature 65 to close valve seat 64 and open valve seat 72 and thereby connect second chamber 47 to outlet port 73. Since the pressure of fluid in the reservoir 2 is less than that in the line connected to port 41, the pressure of fluid in the first chamber 43 results in downward movement of piston 44 and closure of valve seat 31 to isolate outlet port 45 from inlet port 41. Further movement of piston 44 results in expansion of first chamber 43 and relieves the brake pressure at the wheel brake connected to port 45. Note that the regulator valve 80 plays no part in the relief of brake pressure and thus the first and second restrictions of regulator valve 80 are not operative during this period.

When the associated electronic module detects that the tendency to skid has been overcome, the solenoid 54 is deactivated.

Armature 65 then moves downwards to close valve seat 72 and open seat 64, so that the second chamber 47 begins to receive fluid from the inlet port 41 via regulator valve 80, the function of regulator valve 80 being to control the rate at which second chamber 47 is re-filled and thereby re-pressurised on cessation of the skid signal. When valve seat 64 is opened, second chamber 47 is initially at reservoir pressure so that the pressure in pressure space 102 of regulator valve 80 initially drops substantially to reservoir pressure. Regulator piston 83 then moves downwards due to the fluid pressure in pressure space 101, so that the radially inner ends of the ports 98 become restricted by piston wall 99.

Regulator piston 83 then adopts an equilibrium position in which the downward force on the piston due to the pressure difference between pressure spaces 101 and 102 is equal to the upward force of spring 92. Since the rate of flow through orifice 90 is determined by the pressure difference between pressure spaces 101 and 102, a suitable choice of the characteristics of spring 92 will provide a predetermined rate of flow through orifice 90 to second chamber 47.

In the equilibrium position of piston 83, the total pressure difference acting across the regulator valve, between drilling 42 and bore portion 63, is divided between the pressure difference acting across the orifice 90 and that acting across the second restriction at the inner ends of ports 98. Suitable choice of the spring 92 allows a substantial part of the total pressure drop to act across the second restriction to enable the diameter of orifice 90 to be made of substantial size.

Since the second restriction comprises a number of ports 98 it is very unlikely that this restriction could become totally blocked by foreign matter. If any blockage did occur it would automatically be relieved by upward movement of the regulator piston.

Thus second chamber 47 is re-filled at a predetermined rate controlled by a regulator valve 80 so that the first chamber 43 and the associated wheel brake are re-pressurised at a corresponding rate. If the repressurisation of the wheel brake does not result in a further skid signal, piston 44 moves to its normal position to re-open valve seat 31. If a new skid condition occurs when the wheel gains speed, second chamber 47 is again connected to exhaust port 73 for as long as necessary until the control module signals that a skid is no longer imminent.

Note that no hydraulic fluid is dumped from first chamber 43 during the sequence of operations initiated by a skid signal.

In FIG. 4, parts corresponding to those of the system of FIG. 1 have been given corresponding reference numerals. In this case a hydrostatic tandem master cylinder assembly 103 is used to generate pressure in the wheel brakes 8 and 11 and to provide the energy required to operate modulator piston 44 of the modulator assemblies 13, 14 and 15. The primary pressure space of the master cylinder assembly 103 is connected by a line 104 and line 9 to the inlet port 41 of modulator assembly 15 associated with the wheel brakes 8 of rear wheels 7, and the secondary pressure space is connected by a line 105 and lines 12 to the inlet ports 41 of the modulator assemblies 13 and 14 associated with the front wheel brakes 11. The outlet ports 73 of the modulator assemblies 13 and 14 are not connected to the reservoir in this case, but instead are connected by lines 106a, 106b and 107 to a first pump chamber 108 of a two-cylinder scavenge pump 109 of which the opposed pistons 110, 111 are driven by a common cam 112. A one-way valve 113 is connected in line 107 to prevent flow of fluid from pump chamber 108 to lines 106a and b, and a further one-way valve 114 is connected in an outlet line 115 from pump chamber 108 to brake supply lines 12. The action of piston 110 is thus to return at brake-line pressure fluid expelled from outlet ports 73 of modulators 13 and 14 to the brake line 105 and thereby to the secondary pressure space of master cylinder assembly 103. A reservoir 116 is connected to line 107 on the inlet side of valve 113, to enable the use of a smaller pump 109 than would otherwise be necessary.

Modulator assembly 15 associated with both rear wheel-brakes 8, similarly has exhaust port 73 connected by way of valves 113',114', reservoir 116' and second pump chamber 108' to the brake supply line 104 connected to the primary pressure space of the master cylinder, so that hydraulic fluid exhausted from the second chamber 47 of the modulator assembly 15 is returned at brake line pressure to the primary brake circuit.

The scavenge pump 109 is thus arranged to return to the master cylinder pressure spaces all the fluid exhausted from the modulators 13,14 and 15 during actuation of the modulators on the occurrence of a skid signal. This fluid is then available for re-pressurising the second chambers 47 of the modulators by way of regulator valves 80 on cessation of the skid signals.

The modulator assembly described thus enables a common pressure source to be used for actuating the wheel brakes and for controlling movement of the modulator piston. Previously, it has usually been necessary to provide separate fluid pressure sources operating at different pressures to perform these two functions.

Having described several specific embodiments of the invention for the purpose of example, it should be noted that various changes and modifications may be made to the illustrated arrangements without departing from the spirit of the invention, the full scope of which is defined by the following claims.

I claim:

1. An anti-skid brake control system comprising a wheel having a hydraulic brake, means to sense the presence of skid conditions at the wheel during braking and thereupon to produce a skid signal, a movable wall separating first and second chambers, said first chamber being connected to the hydraulic brake and the movable wall being arranged to increase the volume of said first chamber in response to the skid signal so as to relieve the brake pressure at the braked wheel, a regulator arranged to regulate flow of fluid to said second chamber on cessation of the skid signal such that the movable wall is thereby moved progressively to reduce the volume of said first chamber so as to re-apply the brake pressure at a controlled rate, the regulator comprising a first restriction of predetermined size connected in series with a second restriction defined between two relatively movable members, relative movement of the members being controlled by the difference in fluid pressure across the first restriction such that an increase in this pressure difference causes a reduction in the size of the second restriction, a reservoir, a substantially unrestricted dump passage connecting said second chamber to said reservoir, and a dump valve member controlling said dump passage whereby on opening of said dump valve member in response to the skid signal substantially unrestricted flow of fluid is permitted from said second chamber to said reservoir.

2. A system according to claim 1, in which the first restriction is connected downsteam of the second restriction.

3. A system according to claim 2, in which the first restriction is defined by one of the relatively movable members and that member is resiliently biassed against the action of the pressure difference across the first restriction.

4. A system according to claim 3, in which the relatively movable member defining the first restriction is a piston which is movable within a bore, and the bore wall is the other relatively movable member.

5. A system according to claim 4, in which the piston is cup-shaped, the first restriction is defined by the end wall of the piston and the second restriction is defined between at least one radial passageway in the wall of the bore and an annular recess in the outside of the piston, the recess being in permanent connunication with the inner space of the piston.

6. A system according to claim 4, in which the piston is cup-shaped, the first restriction is defined by the end wall of the piston and the second restriction is defined between at least one radial passageway in the wall of the piston and an annular recess in the wall of the bore, the annular recess being connected to a source of hydraulic fluid.

7. A system according to claim 1, in which a three-way valve incorporating said dump valve member is interposed between the second chamber and the regulator, the valve being responsive to the skid signal such that the second chamber normally is connected to the regulator but on production of the skid signal the valve is switched to open said dump valve member thereby to connect the second chamber to said reservoir.

8. A system according to claim 7, in which a two-way valve is connected in the fluid supply line to the hydraulic brake, the valve being arranged to close when the movable wall moves to increase the volume of the chamber connected to the hydraulic brake.

9. A system according to claim 8, in which the movable wall and the first and second chambers, the regulator, the three-way valve and the two-way valve are all contained within a single housing.

10. A system according to claim 1, in which a common source of hydraulic fluid supplies the regulator and the hydraulic wheel brake.

* * * * *